(12) United States Patent
Mynatt et al.

(10) Patent No.: US 8,230,810 B2
(45) Date of Patent: Jul. 31, 2012

(54) LIFT-ASSISTED LITTER BOX SYSTEM

(75) Inventors: Craig Mynatt, Pleasanton, CA (US);
Kenneth Michael Larson, Walnut Creek, CA (US)

(73) Assignee: Craig Mynatt, Pleasanton, CA (US)

( * ) Notice: Subject to any disclaimer, the term of this patent is extended or adjusted under 35 U.S.C. 154(b) by 103 days.

(21) Appl. No.: 12/765,137

(22) Filed: Apr. 22, 2010

(65) Prior Publication Data

US 2011/0259275 A1  Oct. 27, 2011

(51) Int. Cl.
*A01K 23/00* (2006.01)
*A01K 1/01* (2006.01)

(52) U.S. Cl. ........................................ 119/168; 119/166

(58) Field of Classification Search .................. 119/161, 119/163, 165, 166, 168; 108/99, 100, 108, 108/94, 95, 138; 312/408, 351, 325
See application file for complete search history.

(56) References Cited

U.S. PATENT DOCUMENTS

| | | | |
|---|---|---|---|
| 1,390,455 A | | 9/1921 | McCollom |
| 3,100,474 A | | 8/1963 | Schneider |
| 3,141,441 A | | 7/1964 | Russell |
| 3,516,369 A | | 6/1970 | Bidak et al. |
| 3,752,120 A | * | 8/1973 | Pallesi ........................... 119/166 |
| 3,796,188 A | | 3/1974 | Bradstreet |
| 3,908,597 A | | 9/1975 | Taylor |
| 4,359,966 A | | 11/1982 | Casino |
| 4,505,226 A | | 3/1985 | Carlson |
| 4,602,593 A | | 7/1986 | Gross |
| 4,817,560 A | | 4/1989 | Prince et al. |
| 4,970,987 A | | 11/1990 | Deyle |
| 5,042,430 A | | 8/1991 | Casmira |
| 5,148,768 A | * | 9/1992 | Hinton ........................... 119/500 |
| 5,193,488 A | | 3/1993 | Walton |
| 5,195,464 A | | 3/1993 | Mutter |
| D351,489 S | | 10/1994 | Helfrick |
| 5,419,282 A | | 5/1995 | Dennis |

(Continued)

FOREIGN PATENT DOCUMENTS

GB 2180732 A * 4/1987

*Primary Examiner* — Son T Nguyen
*Assistant Examiner* — Kathleen Iwasaki
(74) *Attorney, Agent, or Firm* — Schneck & Schneck; David Schneck

(57) ABSTRACT

A litter box device for use by pets. The device includes at least two litter boxes arranged as stacked drawers held in a housing. The upper drawer is accessible to a pet through an entry to the housing. The bottom of each drawer has a screen and a slidably removable drawer bottom. Removal of the slidably removable drawer bottom allows the contents of the drawer to pass into the underlying drawer. After pets excrete waste into the litter in the top box, the loose litter is separated from the waste clumps by sliding the removable drawer bottom from the top drawer, allowing loose litter granules to flow down through a screened opening into the underlying drawer. The top drawer will retain the waste clumps on its screen within the upper drawer, the screen positioned proximate to the slidably removable drawer bottom. The waste clumps may then be removed from the drawer and screen. The lower drawer containing the filtered litter can be guided up into the top position. A lift assisting mechanism allows the lower drawer to be lifted into the upper drawer position without the operator having to bear the full weight of the litter-filled drawer. After the emptied drawer is placed in the vacant lower drawer position the apparatus is ready for pet use again.

20 Claims, 5 Drawing Sheets

U.S. PATENT DOCUMENTS

| | | |
|---|---|---|
| D363,369 S | 10/1995 | Hoth |
| 5,503,110 A | 4/1996 | Miller |
| 5,507,248 A | 4/1996 | Gabbert |
| 5,517,947 A | 5/1996 | Christman |
| 5,713,302 A | 2/1998 | Walter |
| 5,749,317 A | 5/1998 | Richey et al. |
| 5,785,000 A | 7/1998 | Barbary |
| 5,806,461 A | 9/1998 | Kiera |
| D404,854 S | 1/1999 | Howarth |
| 5,893,336 A | 4/1999 | Vice et al. |
| 5,983,831 A | 11/1999 | Thompson |
| 6,050,223 A | 4/2000 | Harris |
| 6,286,458 B1 * | 9/2001 | Rawson ............ 119/165 |
| 6,745,719 B1 | 6/2004 | Howerton |
| 7,011,042 B2 | 3/2006 | Martello et al. |
| 7,213,535 B2 | 5/2007 | Schmidt et al. |

* cited by examiner

LIFT-ASSISTED LITTER BOX SYSTEM

TECHNICAL FIELD

The technical field of the disclosed embodiments relates generally to animal litter boxes.

BACKGROUND

Traditional litter boxes are simply containers to hold granular absorbent material. Animals are then trained to urinate and defecate into this material. Such pet litter generally contains an absorbent to contain liquid and chemicals to control smell and neutralize animal waste products. Most modern litters form clumps of litter and waste when wet, to allow easier removal of soiled litter. To clean the litter box after waste accumulates, someone must manually sift through the soiled litter mixture and scoop the waste clumps out. This is a generally unpleasant, time-consuming chore that requires the person to handle foul-smelling waste, often while coming into contact with unsanitary dust and animal waste from the soiled litter.

Some pet litter boxes have been designed to separate pet waste from litter material. For example, a screen may be included to aid in the removal of soiled litter clumps. Additionally, there are stacked litter box designs that utilize a screen to filter out waste clumps as litter flows from one box into another.

Two issues remain with the use of pet litter systems. First, there is a need to minimize exposure to the dust and germs associated with the litter. Second, there is a need to rapidly and using minimal effort remove clumps from the litter.

SUMMARY

The above and other issues are addressed with a device for holding pet litter. The device includes a housing with an open front section. Mounted at this open front section is a first and second drawer positioned in an upper and lower position respectively, one above the other. Each drawer includes a screen proximate to the drawer bottom and a retractable drawer bottom. These drawers are mounted on the housing in a runner ramp system, in which the first and second drawers are vertically stacked. The drawers move on supports positioned in the runner ramp system. This system provides horizontal and inclined runners allowing the drawer to be gradually repositioned from the lower position to the upper position as the supports on the drawer move through the runners.

The housing of this device may include an upper and lower section, with the lower section holding the drawers. The housing may also be divided into a pet entrance section and a litter drawer section. A partial wall may separate these sections. This would require the animal using the litter area to walk across an entryway, providing a means for ensuring that litter is less likely to move from the device onto the surrounding floor. This entrance may include a ramp, which may have a textured surface. Such a textured surface also helps ensure that any litter on the pet's feet is retained on the ramp and does not travel into the surrounding floor.

The drawers may include an outward-sloping contour at the back of the drawer to help channel the clumps when disposing of them. The drawer may also include a sealing mechanism to seal the drawer bottom and prevent spilling. This may be a gasket, a spring, or other sealing means. The drawer bottom may also include a latch. Depressing the latch allows retraction of the drawer bottom.

DETAILED DESCRIPTION

The designs of the various embodiments include a housing for holding two interchangeable drawers. These drawers are positioned one over the other. Each drawer contains a screen proximate to the base of the drawer and a drawer bottom that may be at least partially removed from the base of the drawer. Kitty litter is placed into the top drawer. A pet has access to this top drawer for depositing bodily wastes. When the clumps of litter need to be removed, the bottom of the drawer is at least partially retracted. The drawer bottom is retractably mounted at the base of the drawer and tabs on the drawer bottom allow a user to retract the drawer bottom. The unclumped litter flows into the drawer below. Clumps containing waste are retained on a screen affixed within the drawer, proximate to the bottom of the drawer. In one embodiment, the screen is just above the drawer bottom. This drawer may then be slid from the housing.

In one embodiment, the back side of the drawer has a shape forming a clump channel. Such a clump channel is angled, for example such that the top of the back wall, in part or entirety, is positioned further back than the bottom of the back wall. This creates a clump channel into which the clumps will move when the drawer is tipped.

Once the first drawer has been removed to dispose of the clumps, the second drawer, now in the lower position and filled with unclumped litter, must be moved to the upper position. The housing includes a slide mechanism by which the drawer may be moved to the raised position. This slide mechanism allows the drawer to be moved to the upper position without hefting the entire weight of the filled drawer.

Figure 1:
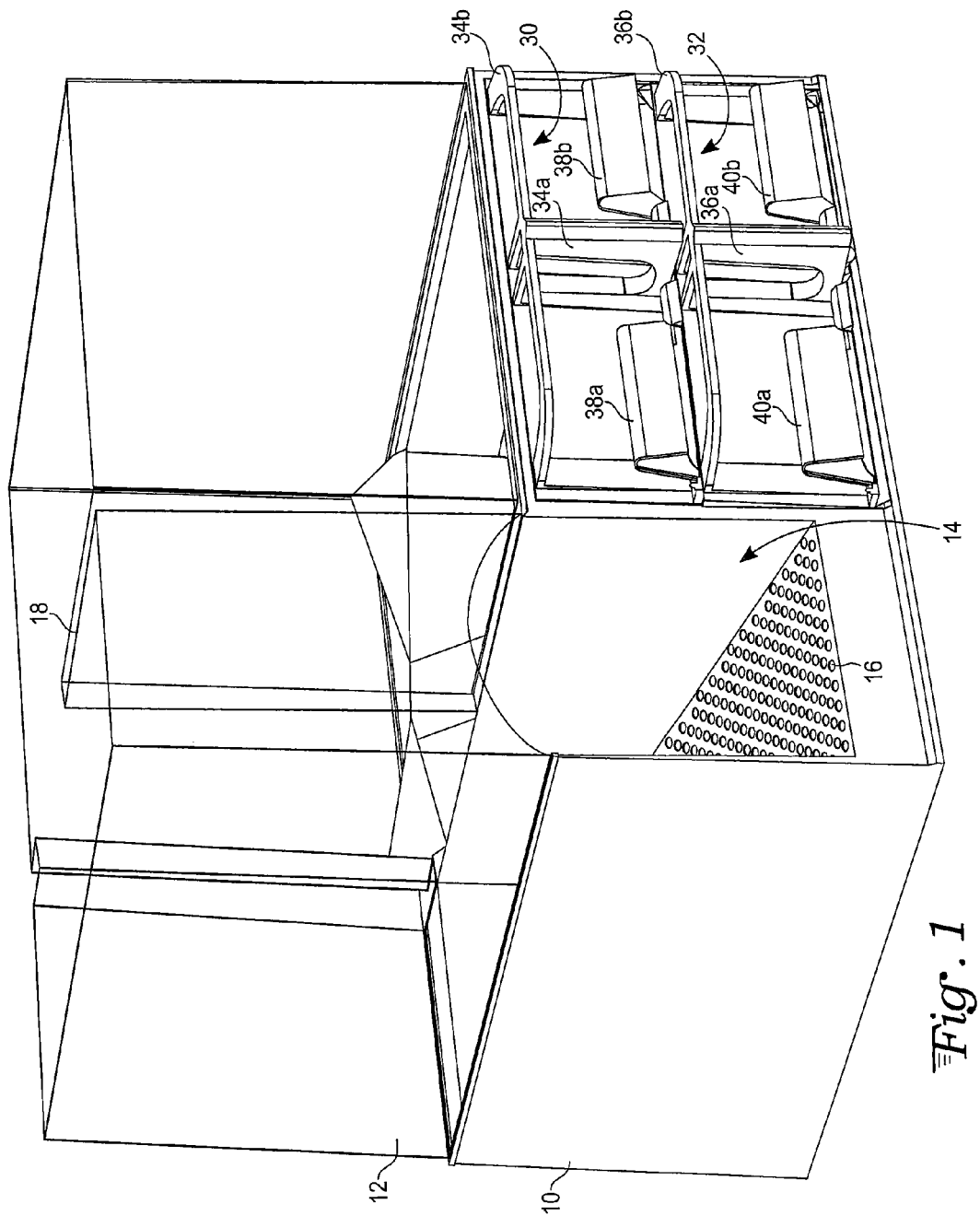
FIG. 1 is a perspective of a first embodiment showing a pet entry.

With preference to FIG. 1 an embodiment is shown of a pet litter or kitty litter holding device. For the purposes of the present specification, the terms pet litter and kitty litter are to be equivalent and generally refer to granular material. Animals may be trained to eliminate bodily wastes into this material.

The device includes a lower housing 10 and an upper housing 12. In the illustrated embodiment's upper housing 12 may be made of a clear polymeric material such as an acrylic plastic. This allows a user additional protection from pet litter moving from the housing onto floor surfaces while also allowing a user to visually inspect the pet litter and determine if the litter requires changing.

The pet gains entrance through pet entrance 14. The pet then may walk up a ramp 16. The ramp 16 may have small plastic protrusions creating a textured surface. This allows any litter remaining on a pet's feet to be jarred off before the pet exits the housing through entrance 14. The upper housing 12 may be divided by upper housing partition 18. This will then require that the pet walk up textured ramp 16 to gain access to the area where the kitty litter is held. The lower end of the ramp at the entrance to the housing is proximate to the base of the housing, and the upper end of the ramp is proximate to the top of the upper drawer. Alternatively, the entranceway could be a flat or nearly flat entrance area, with an access in the rear to the litter area. In this embodiment, a cat or other pet would jump up to the litter area.

The lower housing 10 holds a first drawer 30 and a second drawer 32. These drawers are stacked one over the other such that the bottom of the upper drawer is above the open top of the lower drawer. These drawers include a first drawer vertical handle 34a on the first drawer 30 and a second drawer handle 36a on the second drawer 32. The first drawer has a bottom which may be at least partially retracted by pulling the first drawer bottom tabs 38A and 38B. The second drawer has a bottom which may be at least partially retracted from second drawer 32 using second drawer bottom tabs 40A, 40B.

As described above the kitty litter would initially be placed in first drawer 30 when this drawer is in the upper position as shown. To remove the waste clumps from the litter after a pet has relieved itself, first drawer bottom tabs 38A, 38B would be pulled at least partially retracting the bottom of the drawer. A screen proximate to the bottom of the drawer would retain any clumps of kitty litter. Proximate to the bottom means closer to the bottom of the drawer than to the open top of the drawer. It is preferred that the screen be fixed to the front and back and sides of the drawer, such that any pet litter moving from within the drawer must pass through the screen. The unclumped kitty litter would pass through the screen and into lower drawer, seen as the second drawer 32 in FIG. 1. The first drawer 30 would then be removed and emptied of waste clumps, and the second drawer 32 raised to the upper drawer position. The first drawer 30 would then be replaced below second drawer 32.

Figure 2:
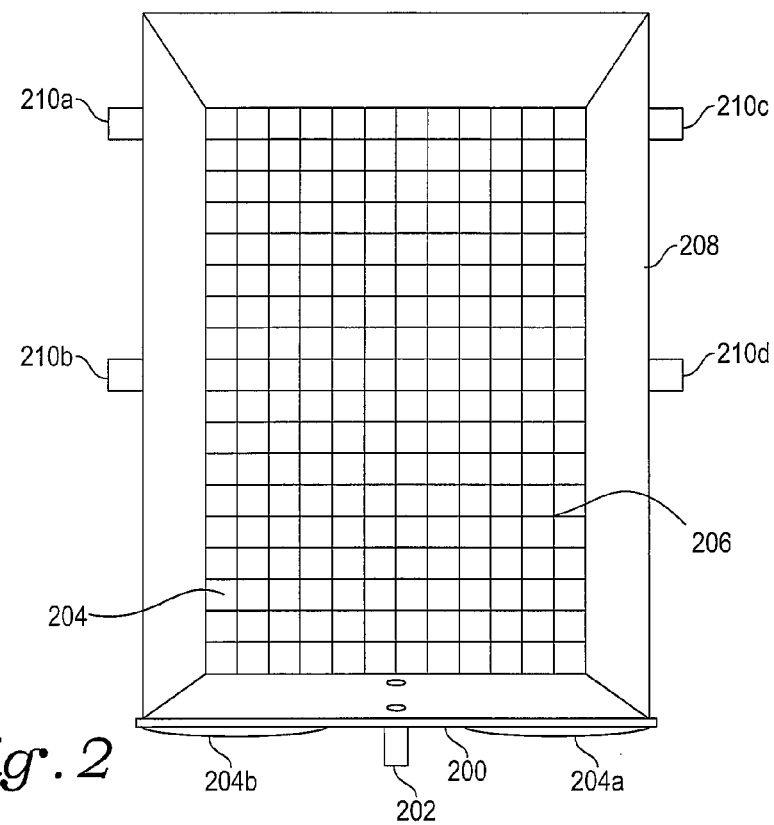
FIG. 2 is a top view of a pet litter holding drawer.

With reference to FIG. 2, the top view of the drawer shows drawer 200 including a drawer handle 202. This drawer handle may be used for pulling the drawer in and out of the housing to reposition the drawer. Although the handle is shown as a vertical pull handle, this is illustrative and any other handle orientations are contemplated. As shown in FIG. 1, the first drawer may include a vertical handle 34a and a horizontal stabilizer 34b and likewise the second drawer may include a vertical handle 36a and a horizontal stabilizer 36b. The vertical handle allows greater control of the drawer when the drawer is removed. This helps manage the torque when carrying the weighted drawer by the handle. The horizontal stabilizers at the top of the drawer may be required to provide additional structural integrity. Drawer bottom tabs 204A, 204B allows the drawer bottom 204 to be at least partially retracted. When drawer bottom 204 is retracted any clumps in the kitty litter are retained against screen 206. These clumps may then be dumped from the drawer when the drawer is removed from the housing. The side walls 208 of the drawer define the drawer interior where the kitty litter would be retained. The drawers may be slid on a runner using projecting supports such as pegs or wheels 210A, 210B, 210C, and 210D.

Figure 2B:
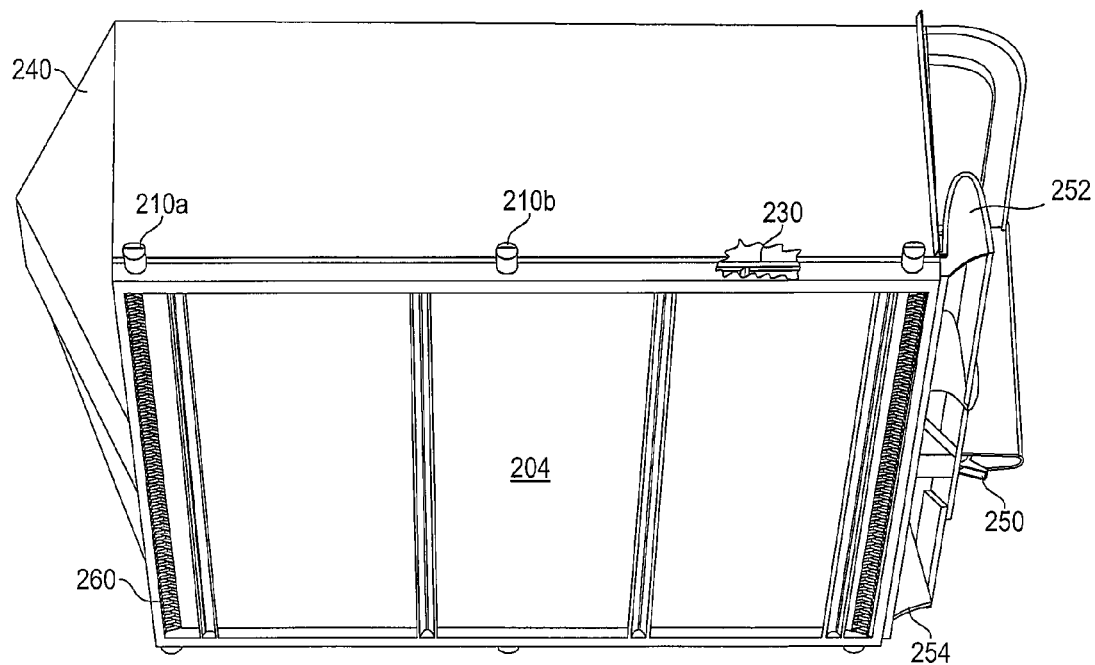
FIG. 2B is a bottom perspective view of a pet litter holding drawer showing additional features of the drawer.

Additional features may be added to the drawer to allow the drawer bottom to better retain the pet litter. With reference to FIG. 2B a number of features are illustrated with respect to the drawer to better ensure that pet litter does not leak from the drawer. A latch 250 may be included on the drawer bottom. The latch may secure onto a location within the drawer handle. When the latch 250 is depressed, the drawer bottom may be retracted. This prevents unintentional movement of the drawer bottom. This latch is illustrated as positioned centrally on the drawer bottom 204 at the front edge, between tabs 252, 254.

An end sealing mechanism 260 may also be used. This mechanism may be a spring, a resilient gasket, or other sealing means. This sealing mechanism acts to seal the edges of the drawer bottom or press the drawer bottom upward into its guide rails, restricting litter from escaping out the bottom of the drawer.

The drawer bottom 204 may also include side lips 230 in the left and right sides. These lips run through a guide slot on the drawer allowing the drawer bottom 204 to be retracted.

Also shown in FIG. 2B is the shape of the back wall 240 of the drawer. This shaped may be angled back from the front of the drawer, and have side sections that are angled to form a channel. This channel may be used in dumping the litter clumps from a drawer.

Figure 3:
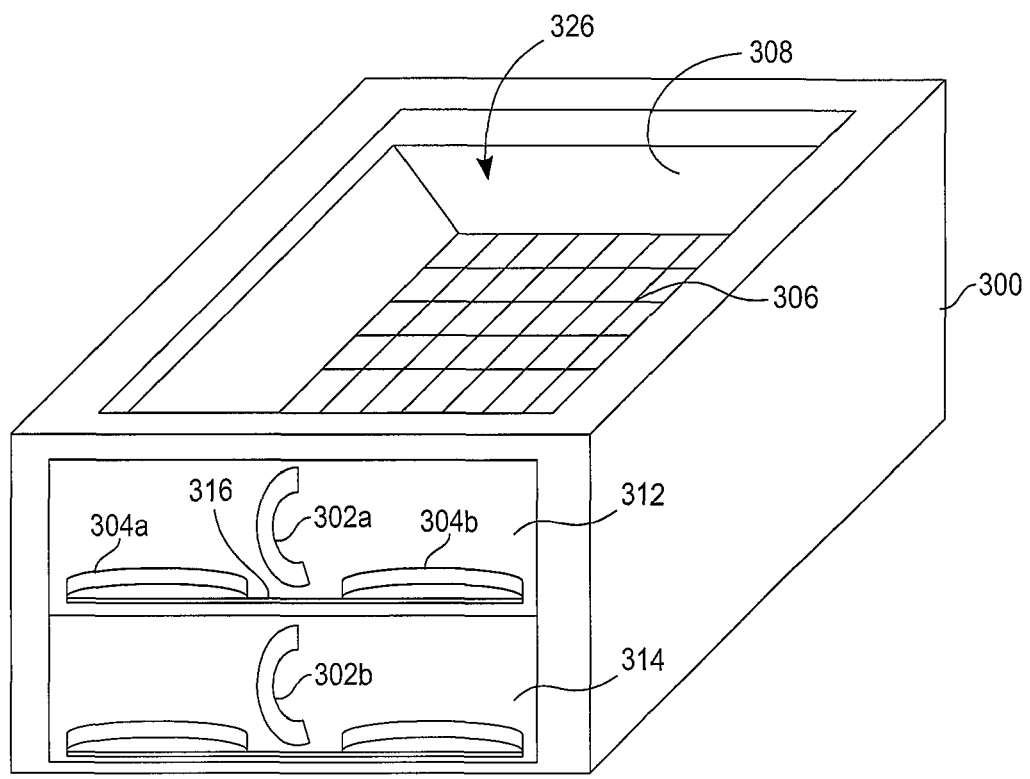
FIG. 3 is a perspective view of another embodiment showing two stacked drawers held within a drawer guide housing.

With respect to FIG. 3 another embodiment of the device having a more compact housing footprint is shown. In this embodiment a housing 300 holds a first drawer 312 and a second drawer 314. The litter holding reservoir 326 is openly accessible to a pet and when filled with pet litter provides a location in which a pet may eliminate bodily waste. This litter is held between drawer sides 308. The litter is initially held in first drawer 312. After the pet has deposited waste into the litter material and clumped litter needs to be removed, the drawer bottom 316 may be retracted by pulling on the drawer bottom tabs 304A, 304B. The first drawer 312 may then be slid from the upper position using handle 302A and any clumps retained on screen 306 deposited into a waste receptacle. Second drawer 314 having handle 302B may then be slid along a track in the housing into the upper position. The pet litter from the first drawer 312 will have moved through the screen into the second drawer 314. The first drawer can then be replaced in the lower position. The device is then ready for use.

Figure 4:
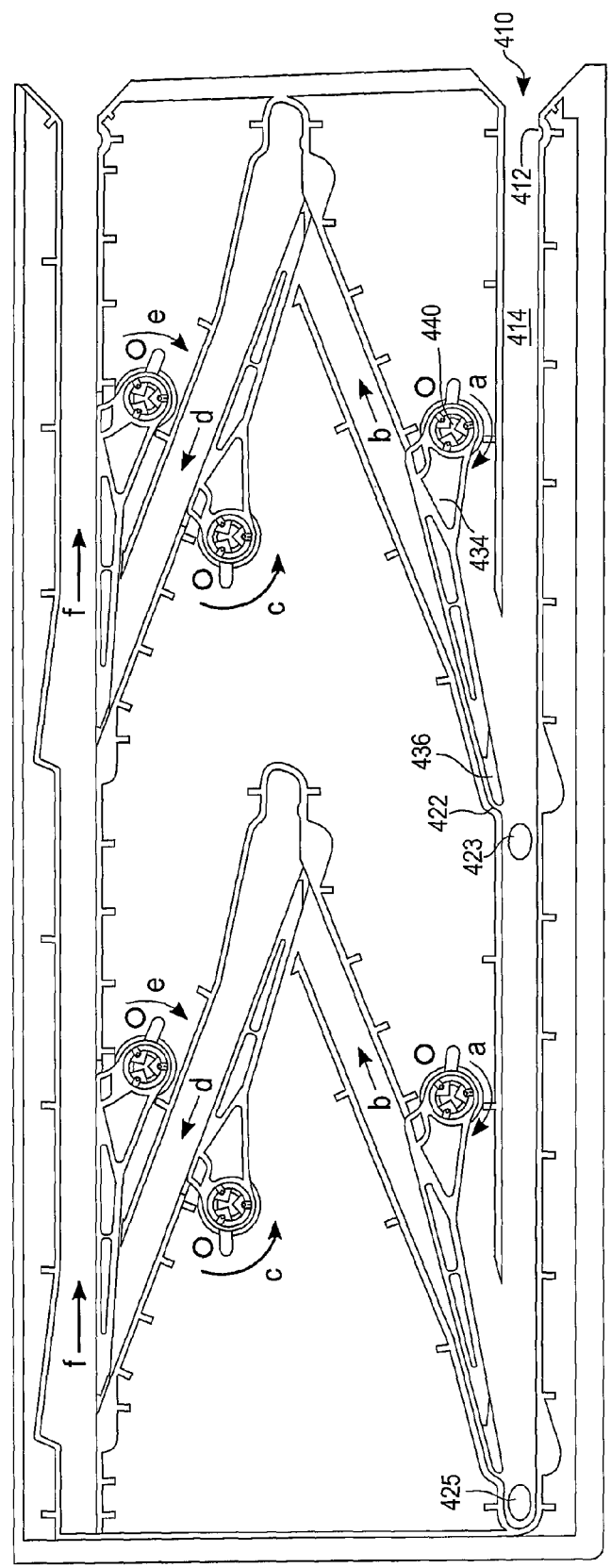
FIG. 4 is a side view of a guide mechanism on one side of the drawer guide housing.

With reference to FIG. 4 the workings of the mechanism on which the drawers are mounted is illustrated. The drawer supports 423, 425 are positioned at the bottom of the drawers and inserted into runner entrance 410. Runner dip 412 provides a tactile indication that the drawer supports have moved over runner dip 412. The drawer supports pass into entry passage 414 when the drawer is inserted. As drawer supports pass a pivoting guide such as pivoting guide ramp 434, the supports on the drawer (e.g., first support 425 and second support 423) displace pivoting guide ramp 434 upward into head space 422. Head space 422 is sized to be about as big as the guide toe 436 of pivoting guide 434. The head space allows the guide to pivot upward and have the drawer support pass, while still confining the drawer support to a track, thus preventing excessive movement or tipping of the drawer. The pivoting guide pivots in the direction of arrow A as the drawer support 423, 425 moves past the pivoting guide 434. Once the drawer support 423, 425 has passed the pivoting guide 434 the pivoting guide 434 mounted on guide bearing clip 440 will gravitationally move back such that a drawer runner ramp is formed allowing the drawer support to move up the ramp in the direction of arrow B. Alternatively, springs (e.g., an elastic band) could be used with the pivoting guide to ensure it returns to its resting position. At the top of the movement indicated by arrow B a second pair of angled pivoting guides will move in the direction indicated by arrow C admitting the drawer supports 423, 425 to a midway point. At this point the front of the drawer would be partially out of the housing, but about half of the drawer would remain in the housing. This provides adequate weight balance such that the device does not tip during drawer movement. Additionally, in this position litter can be added to the drawer to replenish litter removed when the clumps are disposed. When the drawer is pushed back in, the drawer supports would move up the second set of drawer runner ramps in the direction of arrow D. At the top of this ramp two additional pivoting guides would again pivot as indicated by arrow E again creating a space for the drawer supports 423, 425 to pass. The supports at the bottom of the drawer now are positioned in a top runner. This drawer may then be removed by simply pulling on the handle of the drawer. The supports on the drawer will then move along an upper runner, a path indicated by arrows F. This would generally be done with a drawer containing clumped waste only after the unclumped litter has dropped down into the drawer in the lower position.

The drawers are movable by a runner ramp system mounted on two opposing sides of the interior side walls within the housing. The runner ramp system includes two generally horizontal runners. When the two drawers are inserted, this positions the two drawers in a lower and an upper position, with the lower drawer essentially directly under the upper drawer, such that litter from the top drawer flows into the bottom drawer and does not spill. In some embodiments, the top drawer may be slightly back from the bottom drawer.

Inclined runners connect the top and bottom horizontal runners. Pivoting guides are at the transition points between horizontal and inclined runners. The illustrated embodiment includes two parallel inclined runners per side to create at least four points of contact with the drawer supports, keeping a drawer substantially level while moving along the inclined runners. The illustrated embodiment shows a change in direction of the inclined runners and an additional set of pivoting guides between the top and bottom horizontal runners.

Figure 5:
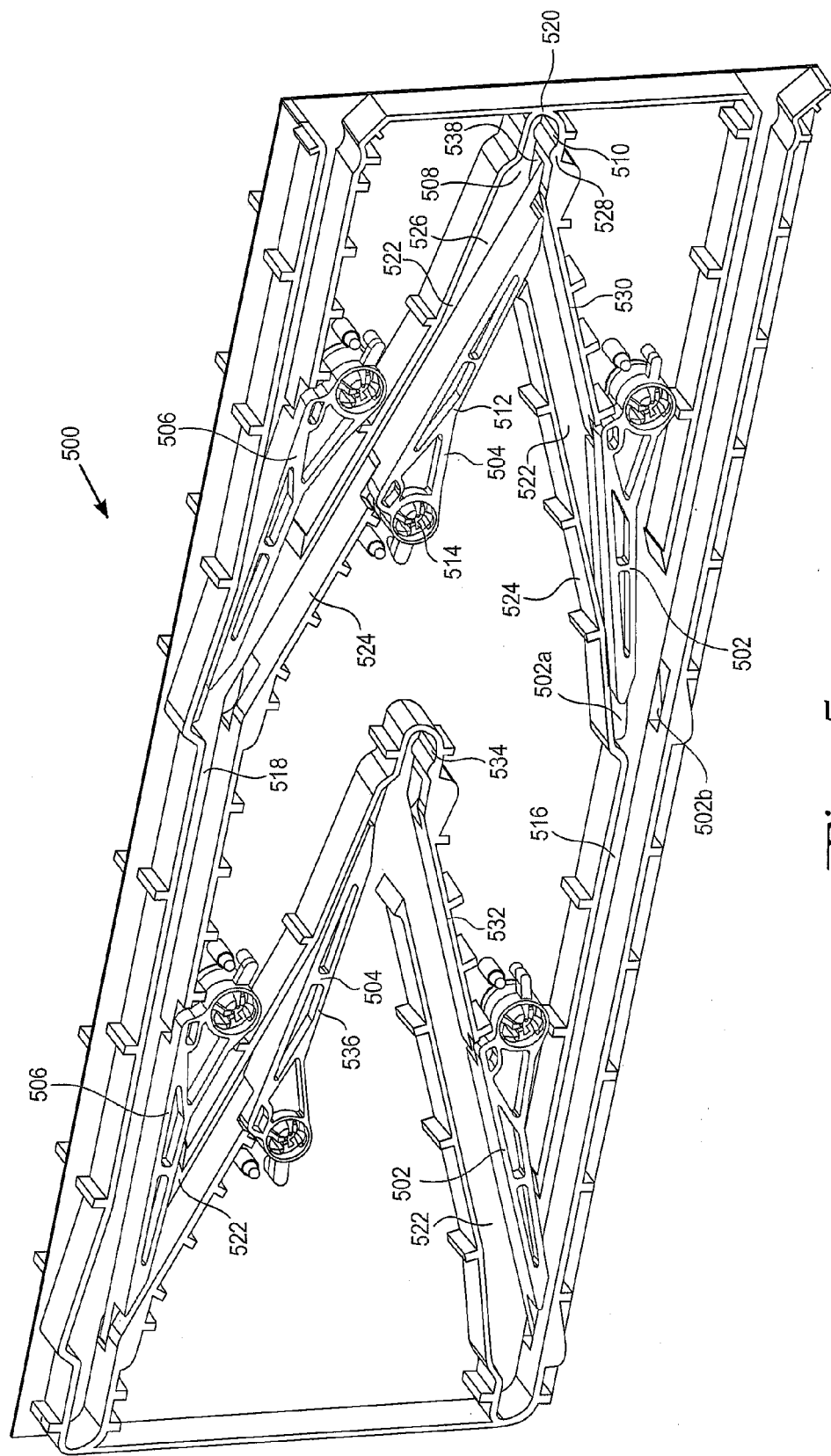
FIG. 5 is a perspective view of the guide mechanism of FIG. 4.

As shown in FIGS. 4 and 5, the runner ramp system 500 connects the bottom horizontal runners 516 to the top horizontal runners 518. The runner ramp system 500 has a direction-changing midway point 508 that is at a forwardmost point 520 of the runner ramp system 500 towards the open front face section of the housing. Inclined runners 522 of the runner ramp system 500 connect the bottom horizontal runners 516 and the top horizontal runners 518 as a sideways V-shaped rampway 524. The midway point 508 of the sideways V-shaped rampway 524 defines a single switchback 526 where the inclined runners 522 change in direction at the forwardmost point 520 of the runner ramp system 500, i.e. the point of the runner ramp system 500 that is midway between the bottom and top horizontal runners 516, 518 and most towards the front of the housing.

The pivoting guides include a midway pivoting guide 512. The midway pivoting guide 512 has a pivot point 514 above and rearward of the midway point 508, and a toe hole 538 proximate to the midway point 508. In the embodiment shown, there are frontward and rearward midway pivoting guides 512, 536. Frontward is defined as towards the front of the housing, and rearward is defined as towards the rear of the housing or away from the front of the housing.

The runner ramp system 500 includes a drawer resting station 510 at the direction-changing midway point 508. The drawer resting station 510 provides a location at which either of the two drawers can rest while in transit along the inclined runners 522, between the bottom horizontal runners 516 and the top horizontal runners 518. The drawer resting station 510 includes a bump 528 that operates to removably retain the projecting supports of the drawers such as pegs or wheels 210A, 210B, 210C and 210D (shown in FIG. 2). In the embodiment shown, the inclined runners 522 on one side of the housing are paired as a set of frontward and rearward inclined runners 530, 532. The frontward inclined runners 530 and the rearward inclined runners 532 each form a respective sideways V-shaped rampway. Thus, the frontward and rearward inclined runners 530, 532 form frontward and rearward V-shaped rampways, with respective single switchbacks at respective forwardmost points, i.e. each V-shaped rampway has a respective forwardmost point at which a respective single switchback is formed. The runner ramp system includes a frontward drawer resting station 510 and a rearward drawer resting station 534. The opposing side of the housing has a further portion of the runner ramp system.

With respect to FIG. 5 the configuration of the head and toe spaces are shown. In this figure the pivoting guides 502, 504, and 506 are shown in both the raised and resting positions. The toe 502A of the lower pivoting guide is shown. This toe is about half of the width of the rest of the pivoting guide and fits into toe hole 502B. This configuration allows the drawer supports to move across a passageway without falling into the toe hole. At the same time the toe hole 502B allows the toe 502A to seat providing additional stability to the pivoting guide.

The steps of the use of the device are simple:

1. Retract the slidable drawer bottom from the first drawer in the upper drawer position. This first drawer in the upper position contains a volume of unclumped kitty litter and kitty litter clumps. The volume of unclumped kitty litter will move through the screen at the bottom of the drawer into the underlying drawer.

2. The drawer bottom of the top drawer may then be reinserted into the top drawer. Alternatively the drawer bottom may be reinserted after the clumps are removed in a later step.

3. The top drawer can then be slid from the housing and the clumps of litter removed from the drawer. This would occur by tipping the drawer toward the angled back side wall, allowing clumps to move into the clump channel. The clumps then can be removed from this clump channel.

4. The bottom drawer can then be pulled forward, moving it up the first runner ramp set (path b in FIG. 4). The raised bump at the top of this first ramp would indicate that the top of the ramp has been reached. The drawer would then be pushed back, moving it up the second runner ramp set (path d in FIG. 4). At this location, the drawer is now in the position of the upper drawer.

5. The empty drawer, formerly in the upper position, can now be placed in the lower position.

What is claimed is:

1. A device for holding pet litter comprising:
    a housing having an open front face section;
    a first drawer slidably mounted to be moved with first drawer supports moving on top horizontal runners and bottom horizontal runners in and out of said open front face section to an upper position and a lower position respectively, said first drawer including a screen proximate to a first drawer bottom and an at least partially retractable drawer bottom;
    a second drawer slidably mounted to be moved with second drawer supports moving on the top horizontal runners or the bottom horizontal runners in and out of said open front face section, said second drawer including a screen proximate to a second drawer bottom and an at least partially retractable drawer bottom; and
    a runner ramp system within said housing, said runner ramp system connecting the bottom horizontal runners to the top horizontal runners and having a direction-changing midway point that is at a forwardmost point towards the open front face section;
    wherein when said first or said second drawer is in the upper position, a first drawer open top or a second drawer open top, respectively, is accessible to a pet.

2. The device of claim 1, wherein said housing includes a lower section and an upper section, said lower section holding said first drawer and said second drawer.

3. The device of claim 1, wherein said housing is divided into a pet entrance section and a pet litter drawer section, said pet entrance section and pet litter drawer section divided by a partial wall in an upper section of the housing.

4. The device of claim 3, wherein said pet entrance section includes a ramp extending from below an upper drawer bottom level to above an upper drawer bottom level.

5. The device of claim 1, wherein said first drawer and said second drawer each include a respective outward sloping back drawer wall having side sections angled and shaped to form a clump channel.

6. The device of claim 1, wherein at least one of said first drawer and said second drawer includes a spring or a gasket acting as a bottom sealing mechanism which exerts a force on a respective drawer bottom.

7. The device of claim 1, further including:
a first handle on the first drawer;
a second handle on the second drawer;
a first drawer bottom release latch on said first drawer bottom; and
a second drawer bottom release latch on said second drawer bottom, wherein each release latch may secure to the first or second handle respectively and be locked to prevent movement of an associated drawer bottom or released to allow retraction movement of an associated drawer bottom.

8. The device of claim 1, wherein the runner ramp system within said housing includes pairs of pivoting guides, said pivoting guides pivoting upward to allow the first and second drawer supports to move past the pivoting guides, and pivoting downward to form surfaces over which the first and second drawer supports may move.

9. The device of claim 8, wherein said pivoting guides include end toes and said runner ramp system includes toe holes into which said end toes fit, thereby securing said pivoting guides into place.

10. The device of claim 8, wherein said runner ramp system includes a head space above pivoting guide end toes, said head space proving sufficient clearance for the first and second drawer supports to pass through the runner ramp system.

11. The device of claim 8 wherein the pairs of pivoting guides include a pair of midway pivoting guides having respective pivot points above and rearward of the direction-changing midway point.

12. The device of claim 11 wherein at least one of the midway pivoting guides has a respective toe hole proximate to the midway point.

13. The device of claim 1, wherein said housing includes a ramp extending from below an upper drawer bottom level to above an upper drawer bottom level.

14. The device of claim 1 wherein the runner ramp system includes a drawer resting station at the direction-changing midway point.

15. A litter box system comprising:
two drawers each having a respective screen and a respective retractable bottom; and
a housing having:
top horizontal runners;
bottom horizontal runners;
inclined runners connected to the top horizontal runners and the bottom horizontal runners as a sideways V-shaped rampway having a midway point defining a single switchback at a forwardmost point towards a front of the housing; and
movable guides admitting each of the two drawers from the bottom horizontal runners to the inclined runners, thence to the midway point of the inclined runners and from the inclined runners to the top horizontal runners, and preventing admittance to either of the two drawers from the top horizontal runners to the inclined runners nor and to the bottom horizontal runners except by a removal of the either of the two drawers from the housing and a reinsertion of the either of the two drawers to the housing at the bottom horizontal runners.

16. The litter box system of claim 15 wherein a one of the two drawers is confined by the bottom horizontal runners while being pushed from outside of the housing to a lower position in the housing with a further one of the two drawers in an upper position in the housing.

17. The litter box system of claim 15 wherein the top and bottom horizontal runners, the inclined runners and the movable guides are arranged so that a one of the two drawers can be sequentially:
pushed from outside of the housing to an upper position in the housing, guided by the top horizontal runners;
pulled out of the housing, guided by the top horizontal runners;
pushed from outside of the housing to a lower position in the housing, guided by the bottom horizontal runners;
pulled up and partially out of the housing to the midway point, while being guided by the movable guides from the lower position on to the inclined runners and thereupon to the midway point, whereupon about half of the one of the two drawers remains in the housing; and
pushed up and in to the housing guided by the inclined runners from the midway point to the upper position.

18. The litter box system of claim 15 wherein the movable guides include pivoting guides at transition points between the bottom horizontal runners and the inclined runners, at the midway point, and between the inclined runners and the top horizontal runners.

19. The litter box system of claim 18 wherein the pivoting guides include at least one pivoting guide at the midway point having a respective pivot point above and rearward of the midway point.

20. The litter box system of claim 15 wherein the inclined runners include a drawer resting station at which either of the two drawers can rest at the midway point.

* * * * *